April 17, 1928.

W. GUETHLER 1,666,698

DOUGH MIXER

Filed June 19, 1926

INVENTOR
William Guethler
By W. W. Williamson
Atty.

April 17, 1928.  W. GUETHLER  1,666,698
DOUGH MIXER
Filed June 19, 1926   2 Sheets-Sheet 2

INVENTOR
William Guethler
By W. W. Williamson Atty.

Patented Apr. 17, 1928.

1,666,698

UNITED STATES PATENT OFFICE.

WILLIAM GUETHLER, OF PHILADELPHIA, PENNSYLVANIA.

DOUGH MIXER.

Application filed June 19, 1926. Serial No. 117,009.

My invention relates to new and useful improvements in dough mixers, and has for its primary object to provide an exceedingly simple and effective device of this character, whereby the kneading process is more thoroughly accomplished so that the gluten or flour is modified to such an extent that it becomes more elastic and less resistant to the yeast gases, making a much better dough which will result in finer bread.

Another object of this invention is the provision of means to effect at least four distinct actions on the dough, which actions are commonly known as "packing", "squeezing", "pulling" and "tearing".

A further object of my invention is the construction of an agitator including two spiders carrying a pair of bars, circular in cross section, paralleling each other, but oblique to the axial center of the agitator shaft, and another pair of bars, oval in cross section, and each having one end offset to the other, but parallel to agitator shaft.

With these and other ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which.

Figure 1:
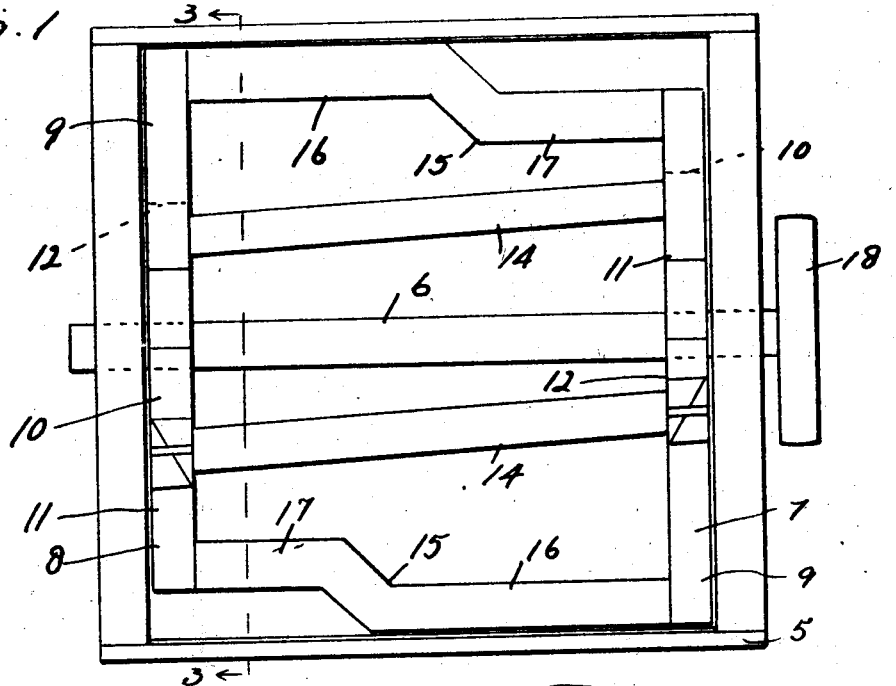
Fig. 1, is a plan view of a dough mixer constructed in accordance with my invention.
Figure 2:
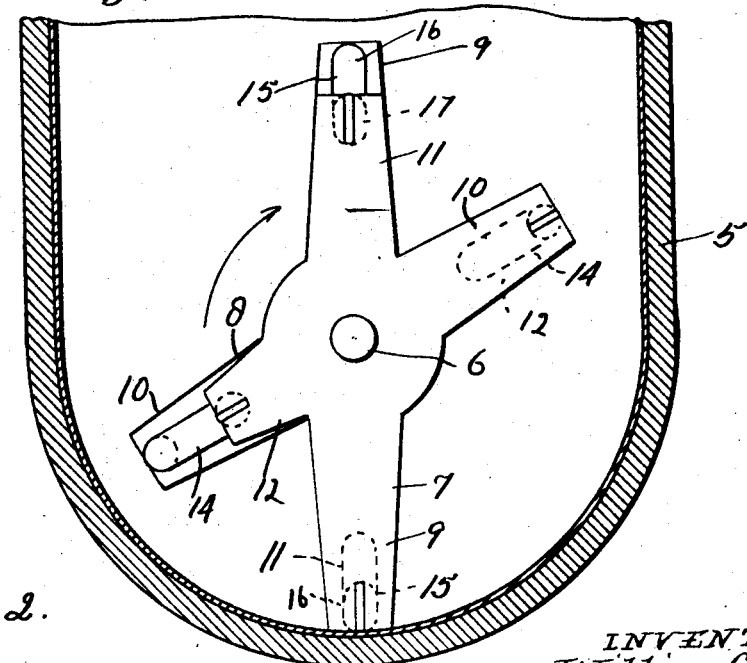
Fig. 2, is a vertical section of the bowl showing an end elevation of the agitator.

In carrying out my invention as herein embodied, 5 represents the bowl which may be of any well-known or ordinary construction, the same preferably being tiltable, as is usual with this class of devices. Suitably journalled within the bowl is a shaft 6, having two spiders 7 and 8 fixed thereon in spaced relation, and each of these spiders includes a long arm 9, two intermediate arms 10 and 11, and a short arm 12. The spiders are so arranged on the shaft that the longer arm of one spider coincides with one of the intermediate arms of the other spider, or, in other words, the longer arms of the spider project in opposite directions from the shaft.

Between the shortest arm of each spider and an aligned intermediate arm of the other spider is mounted a bar 14, circular in cross section so that said bars parallel each other, but are arranged oblique to the axial center of the shaft.

Between the longest arm of each spider and the corresponding intermediate arm of the other spider is mounted another bar 15, which is oval in cross section, and these last-named bars lag behind the adjacent circular bars by about seventy degrees.

Figure 4:
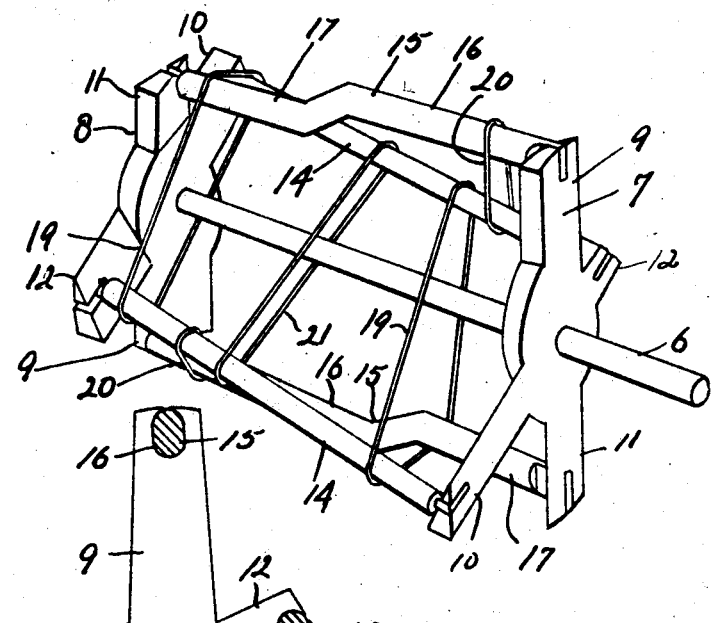
Fig. 4, is a perspective view of the agitator, on a smaller scale, illustrating some of the positions assumed by the dough during the revolving of the agitator.
Figure 3:
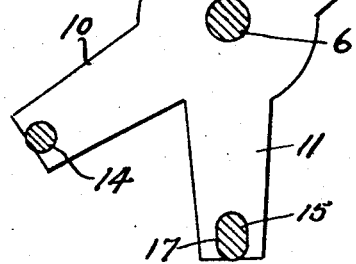
Fig. 3, is a section of the agitator at the line 3—3 of Fig. 1.

The bars 15 have one end offset relative to the other, as plainly shown in Figs. 1 and 4, so that one portion 16 travels in the arc of a circle of approximately the same diameter as the curved portion of the bowl, while the other portion 17 travels in the arc of a circle of less diameter than the curved portion of the bowl, and portions 16 and 17 of one of these bars are in a reverse position relative to the same portions of the other bar, as will be obvious by reference to Fig. 1, but both these portions of each of the bars are parallel to each other and to the shaft.

Power is applied to the shaft of the agitator, which latter consists of the spiders and bars above described, by any suitable means, a conventional showing of which is represented by the pulley 18 fixed to the shaft and to which motion is transmitted through a belt or similar device. During the revolving of the agitator, the portions 16 of the bars 15 will pack the dough against the sides and bottom of the bowl, while the portions 17 being spaced from the inner surface of the bowl will squeeze the dough, while all of the bars will have a tendency to pull said dough, and as the latter becomes wrapped around the different bars, it will be torn therefrom when again contacting with the large body of dough.

Also, during the action of the mixer a certain amount of the dough will be picked up by the portions 17 of the bars 15 and as said bars reach the top of the bowl the dough will be thrown by centrifugal force over the preceding bar 14, from which point it will be dropped into the space between the lowermost bars 14 and 15, and finally caused to pass around the lowermost bar 14, as indicated by the narrow strip of dough 19 in Fig. 4, and because of the oblique arrangement of the bars 14, such strip of dough will tend to move lengthwise of the agitator. Other parts of the dough will be picked up by the portions 16 of the bars 15 and then thrown so as to wrap around said bars and adjacent bars 14, as indicated at 20; while still another part will be picked up and wrapped about the intermediate portions of the bars 14, as at 21.

From the foregoing description it will be obvious that the dough will be thoroughly mixed which will permit fermentation to take place much sooner than usual.

Of course I do not wish to be limited to the exact details of construction as herein shown as these may be varied within the limits of the appended claims without departing from the spirit of my invention.

Having thus fully described my invention, what I claim as new and useful is:

1. A dough mixer including a bowl and an agitator rotatably mounted in said bowl, said agitator comprising a shaft, spiders fixed thereon; a pair of bars disposed between the spiders, on opposite sides of and parallel with the shaft having offset portions and a second pair of bars between the first mentioned ones and on opposite sides of and oblique to the shaft with the axes of said oblique bars and the shaft in the same plane.

2. In a dough mixer, an agitator including a pair of spiders and two pairs of bars disposed between said spiders, each bar of one pair having one end portion offset relative to the other end portion with the outermost offset portion of said bars being at opposite ends of the agitator and both end portions parallel with the axis of the agitator.

3. In a dough mixer, the combination of a bowl; a shaft journalled therein; spiders fixed to said shaft; two bars mounted in the spiders on opposite sides of the shaft, said bars each having one end portion offset relative to the other end portion so as to travel in circles of different diameters, the portion of each of said bars traveling in the circle of larger diameter being located adjacent opposite spiders; and another pair of bars arranged oblique to the shaft with the axes of said last mentioned bars and the shaft in the same plane and traveling approximately seventy degrees in advance of the other bars.

4. In a dough mixer, an agitator comprising a shaft, a pair of spiders fixed on said shaft in spaced relation to each other, each of said spiders including a long arm, a short arm and a pair of intermediate arms, with the short arm of one spider aligned with an intermediate arm of the other spider and the long arm of the first mentioned spider aligned with the other intermediate arm of the second mentioned spider; offset bars mounted between the long arm of each spider and the corresponding intermediate arm of the other spider; and another bar mounted between the short arm of each spider and the corresponding intermediate arm of the other spider.

5. The structure set forth in claim 4, wherein the first mentioned bars are oval in cross section and the last mentioned ones are circular in cross section.

In testimony whereof, I have hereunto affixed my signature.

WILLIAM GUETHLER.